J. GLASSON.
Hoe.
No. 57,119.
Patented Aug. 14, 1866.
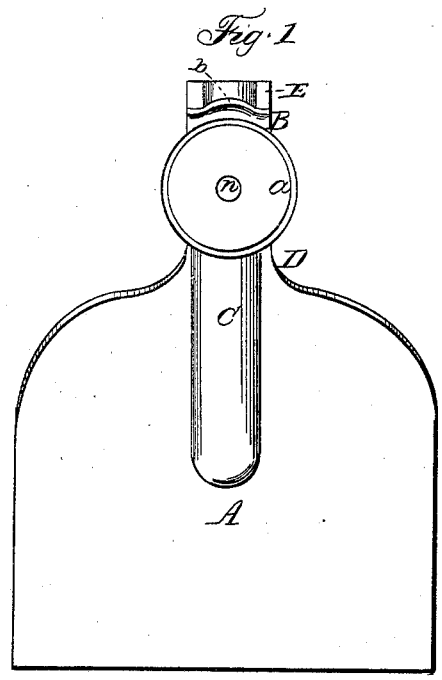
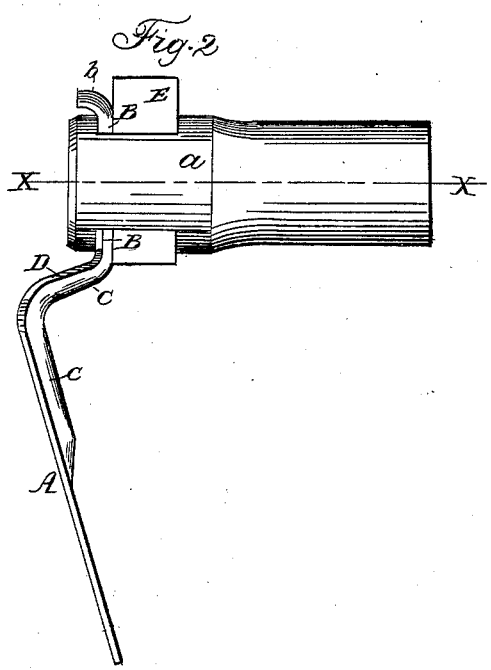
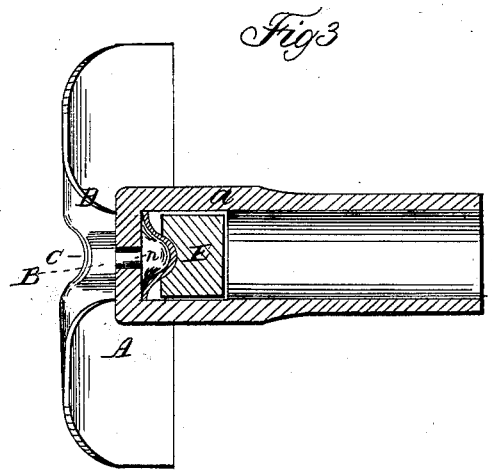
Witnesses:
Inventor,
James Glasson

UNITED STATES PATENT OFFICE.

JAMES GLASSON, OF BROOKLYN, NEW YORK.

IMPROVEMENT IN HOES.

Specification forming part of Letters Patent No. 57,119, dated August 14, 1866.

*To all whom it may concern:*

Be it known that I, JAMES GLASSON, of Brooklyn, in the county of Kings and State of New York, have invented new and useful Improvements in the Construction of Hoes and in Attaching the same to their Handles; and I do hereby declare that the following is a full, clear, and exact description thereof, reference being had to the accompanying drawings, forming part of this specification.

My said invention is a new article of manufacture; and it consists in a hoe formed with a blade of sheet metal extending up as a corrugated tang into and through an eye in a ferrule at the end of the handle, where the said tang is secured by a key or wedge.

My invention is illustrated in the accompanying drawings, in which Figure 1 is a backside elevation of the hoe attached to its handle. Fig. 2 is an edge elevation of the same. Fig. 3 is a section taken on the plane of the line $x\ x$, Fig. 2.

The hoe-blade and its tang or shank is in one piece, cut out of a sheet of metal and struck up by dies.

A designates the blade, and B its tang or shank. The blade may be made of any desired shape, and the tang of the proper length and width to admit of its being secured to the handle as I propose—that is to say, it is sufficiently long to permit of its being thrust through an eye in a ferrule, $a$, on the end of the handle, and of being turned over, as shown at $b$, Figs. 1 and 2, so as to the better secure it against slipping through.

In order to strengthen the hoe as well as the tang, I strike up or form on the face of the blade a corrugation, $c$, which, in the present instance, commences at about the center of the blade and extends up to the end of the tang. This can be done when or immediately after the piece of metal which is to form the blade and tang is struck or cut out of the sheet of metal. There may be one or more of these corrugations $c$, as desired, but I think one would be sufficient to give all the strength required for the purpose of strengthening the hoe at this part and also the tang.

At the point where the tang or shank projects from the blade an offset is made, as shown at D in Figs. 2 and 3, and this will place the blade somewhat beyond the end of the handle, which is desirable, besides permitting of the desired angle relatively with the handle to be given to the blade, as can be readily understood by reference to Fig. 3. The offset having been made, I turn over the end of the tang in a direction toward the end of the ferrule $a$, as shown at $d$, Fig. 2.

To attach the hoe to its handle the tang B is passed through the eye in the end of the ferrule or the handle, as the case may be, so that its turned-over end $b$ will about rest upon the upper surface of the ferrule. A wedge or key, E, is then driven into the eye, and this presses the tang up against the rear wall of the eye in the ferrule, and thus secures the blade to its handle. This is a secure mode of fastening, and one which requires no skill to understand it.

The handle may be inserted in the ferrule by inserting the sharpened end of a wedge in a split therein, and tightened by driving the handle home in the ferrule; or the handle may be tightened by inserting the wedge through a hole, $n$, cut through the end wall of the ferrule; and it will be observed that this hole will furnish a means of access to the wedge for tightening the handle at any time by removing the hoe-shank for the purpose.

My invention provides a cheap and strong hoe-blade, one that is far cheaper than those that have a separate tang attached to the hoe-blade, and the tang, by reason of the corrugation $c$, is as strong in every respect as a tang attached to the blade by rivets or the like. The blade can be sold separate from the handle, and inasmuch as the handle and its ferrule is not likely to become much impaired by use, a new hoe can be obtained every season at a trifling cost.

What I claim, and desire to secure by Letters Patent, is—

The hoe constructed and attached to the handle in substantially the manner specified.

JAMES GLASSON.

Witnesses:
   JAS. BUTLER,
   M. M. LIVINGSTON.